United States Patent [19]

Kreitchman et al.

[11] Patent Number: 4,624,441
[45] Date of Patent: Nov. 25, 1986

[54] INFLATION VALVE

[75] Inventors: Morton A. Kreitchman, South Orange; Kurt Arnold, West Caldwell, both of N.J.

[73] Assignee: Valcor Engineering Corporation, Springfield, N.J.

[21] Appl. No.: 417,069

[22] Filed: Sep. 13, 1982

[51] Int. Cl.⁴ .................. F16K 31/42; F16K 31/11
[52] U.S. Cl. ................... 251/30.01; 251/43; 251/129.03; 244/100 A
[58] Field of Search ............... 251/30, 29, 138, 129, 251/130, 43, 25, 12; 244/100 A, 105, 107; 137/469, 472, 474, 312

[56] References Cited

U.S. PATENT DOCUMENTS

| | | | |
|---|---|---|---|
| 1,351,524 | 8/1920 | LaRue | 137/312 |
| 2,329,001 | 9/1943 | Robinson | 251/30 |
| 2,496,553 | 2/1950 | Littlefield | 251/30 |
| 2,663,319 | 12/1953 | Marinelli | 251/30 |
| 2,891,760 | 6/1959 | Dewar | 251/44 |
| 3,523,556 | 8/1970 | Worrall | 251/130 |

Primary Examiner—Martin P. Schwadron
Assistant Examiner—John S. Starsiak
Attorney, Agent, or Firm—Darby & Darby

[57] ABSTRACT

A pilot-operated valve suitable for pontoon inflation arrangements contains a main valve poppet urged against a valve seat connecting the inlet and outlet ports of the valve. A portion of the inlet pressure urges a piston carrying the valve poppet away from the valve seat, but this is resisted by a portion of the inlet pressure acting in a pressure volume on the opposite side of the piston. By way of an electrical signal, a manual operation or pneumatic pressure, a pilot valve is opened so as to relieve the pressure on the main valve poppet tending to close it. This allows the valve to open and fluid to pass through the valve assembly. Once the pilot valve has opened pressure from the inlet is applied within the pilot valve to hold it in the open position until the inlet pressure has been substantially reduced. Operation of the pilot valve also allows inlet pressure to be applied to a crossover connection of the valve. Thus a series of valves with their crossover connections connected together will all be operated, if one of them is operated so as to generate pressure in the crossover line.

12 Claims, 6 Drawing Figures

INFLATION VALVE

BACKGROUND OF THE DISCLOSURE

This invention relates to valves and, more particularly, to pilot-operated inflation valves that control a pressure medium manually, electrically and/or pneumatically.

Inflation devices or pontoons can be used on aircraft, such as helicopters, to permit them to land on water. An inflated pontoon, however, is rather bulky and diminishes the performance of the aircraft. Therefore, various means have been provided in the prior art for inflating these pontoons when a landing is expected and then retracting them during normal flight. Examples of these are contained in U.S. Pat. No. 3,004,737 to Boyle, et al. and U.S. Pat. No. 3,102,705 to Namsick.

Typically, the pontoons are inflated by a pump or compressed gas supply under the control of a valve. This valve is operated electrically by the pilot of the aircraft. In order to improve the safety of the aircraft when such a pontoon is in use, it is not unusual for these valves to be manually operable so that a safe landing can still be made in the event of an electrical failure.

An electrically-operated valve that might be used for pontoon inflation is described in U.S. Pat. No. 4,180,241 to Fiedler. The Fiedler valve will also operate when presented with a pressure differential that exceeds a preset level. The Fiedler valve additionally provides a manual reset of the valve when an over pressure causes the pneumatic system to operate the valve.

Prior pontoon inflation systems may cause a pilot to make a landing on water when the pontoons are not properly inflated. This can happen when the pontoons are inflated to a pressure less than that required to support the weight of the aircraft. In a case where a single supply of fluid medium is used to inflate pontoons on the left and right side of the aircraft, premature closure of the valve may result in only partial inflation. Visually the pontoons may seem to be fully inflated when they are not. Thus, upon landing the aircraft may sink into the water. The same situation can occur when several tanks are provided for each pontoon. If the valve for only one of the tanks, or less than all of the tanks, opens in response to the signal from the pilot, a partial inflation will occur, but sufficient pressure will not be available.

In a situation in which separate valves extend from a single tank to pontoons on both sides of the aircraft, the operation of only one of these valves will cause one pontoon to inflate and the other to remain uninflated. A quick visual check of the pontoon on the pilot side of the aircraft may show it to be inflated, even though the pontoon on the other side is not. Thus, upon landing in this state, the aircraft will sink into the water on the side without an inflated pontoon.

Because of the critical role that the inflation of pontoons play in the safety of an aircraft, it is important that the inflation valves be operated not only electrically and manually, but also automatically in a manner such that both pontoons are inflated and that the inflation valves remain open until the full supply of pressure medium is delivered to the pontoons.

SUMMARY OF THE INVENTION

The present invention is directed to an inflation valve system that can be operated both electrically and manually and which has a means for assuring that (i) once the valve is operated it will continue to remain open until the inlet pressure has dropped to a sufficiently low level and (ii) the operation of one valve in the inflation system will cause the operation of the others.

In an illustrative embodiment of the invention a pilot-operated valve is provided in which the pilot valve portion of the valve can be actuated by an electrical solenoid which lifts a pin seal from an orifice connected with a pressure volume acting to hold the main valve closed. Movement of the pin seal by the solenoid operation allows the pressure in the pressure volume to pass through the orifice into a crossover line. It also reduces the pressure in the pressure volume, allowing the main valve to open, by connecting the pressure volume through an orifice to the 10 outlet port.

The pressure in the pressure volume is developed through a restricted orifice from the valve inlet pressure. The pin seal is carried by a plunger which has a sensing surface against which the pressure from the pressure volume is applied when the pin seal has been raised. This sensing surface has an area sufficient to keep the plunger in the raised position, so that the pin seal continues to be opened, as long as the inlet pressure, which is passed from the pressure volume against the sensing surface, is held at a significant level by restriction of its discharge through the orifice connected to the outlet port. Thus, once the pilot valve is operated, either electrically or mechanically, the sensing surface holds it in an open position until the inlet pressure has dropped to a very low level.

In addition to the electrical and mechanical operation of the valve, pneumatic operation will occur when pressure is applied to the crossover line because it is directed against the sensing surface, thus causing the plunger to rise and the pin seal to open a connection to the main valve pressure space. As a result, interconnection of the cross-over lines of various valves will cause the operation of one valve to cause high pressure to enter the crossover lines of all the valves and this high pressure will in turn pneumatically operate the other valves in the system, even though they have received no manual or electrical signal to do so.

Since the pressure from the inlet line is blocked from entering the pilot assembly until the pin seal is opened and the crossover channel is connected to the pressure supply downstream of the pin seal, it is evident that the pilot valve and crossover connection need not be of rugged construction, since they receive high pressure only when the valve has been operated.

BRIEF DESCRIPTIONS OF THE DRAWINGS

The foregoing and other features of the present invention will be more readily apparent from the following detailed description and drawings of illustrative embodiments of the invention in which.

DESCRIPTION OF ILLUSTRATIVE EMBODIMENTS

Figure 1:
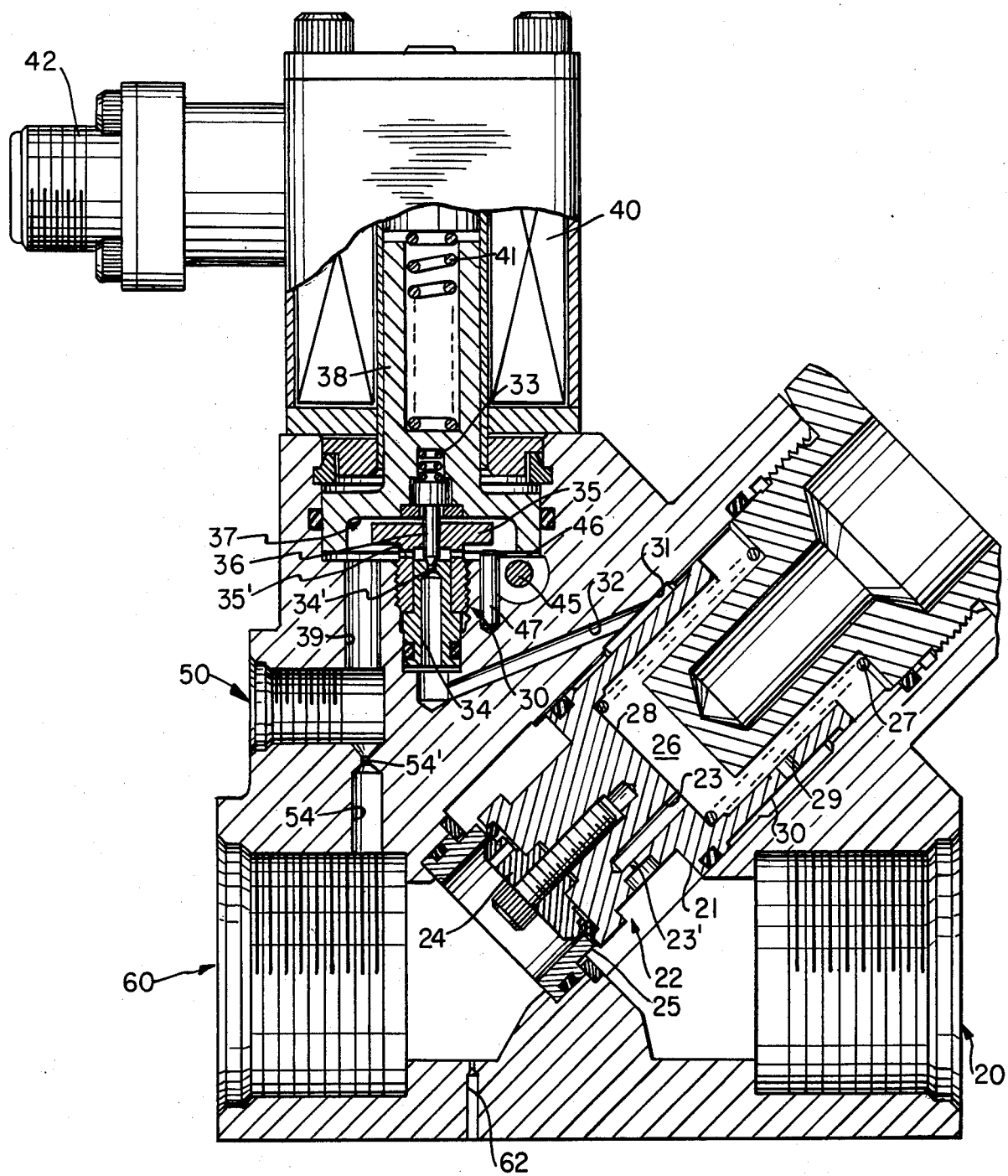
FIG. 1 is a partially-sectioned side view of a valve according to the present invention.

In FIG. 1 there is shown a partial sectional view of a valve according to the present invention. The valve is designed to operate to apply pressure from a pressure source connected to inlet portion 20 to an output line connected to outlet portion 60. The inlet pressure is applied to a lower annular surface 21 of a piston assembly 22, which assembly supports a main valve poppet 24. With the pressure acting on annular surface 21, there is a force acting on the piston 22 tending to lift the main valve poppet 24 from a valve seat 25 and to open the valve so that inlet portion 20 is connected to outlet portion 60. Opposing this force is inlet pressure acting behind the piston 22 in pressure volume 26, which pressure is equal to the inlet pressure because a channel 23 allows the inlet pressure to pass via a restricted orifice 23' from the inlet area to the pressure volume 26. The pressure in volume 26 acts over the entire rear piston area and tends to hold it in the closed position because the rear area is larger than annular area 21 by the size of surface area 28 on the back of the piston. Thus the net force holding poppet 24 down on seat 25 is the inlet pressure times the area 28. A spring 27 also acts in a direction to close the main valve orifice, but its force is so low in comparison to the pressure forces that it only serves the purpose of closing the main valve orifice after the inlet pressure has decayed to a low valve, e.g. from 3000 psi to 45 psi.

The pressure in volume 26 also passes through an opening 29 in the piston into an annular volume 31 which is connected by a channel 32 to a pilot valve 30. In an inlet chamber 34 of the pilot valve, the pressure is blocked by a pin seal 36 that is pushed against a pilot valve orifice or seat 34' by a spring 33 held in a plunger 38, thus maintaining the balance for the closed condition of the main valve.

Pin seal 36, however, can be moved in three different ways, i.e. electrically, manually and pneumatically. It can be moved electrically by applying a current to a solenoid winding 40. This current is applied through electrical connector 42 and causes the plunger 38 to move upward in FIG. 1 against the force of a spring 41, thus pulling the pin seal 36 with it. As a result, the pressure in pilot inlet chamber 34 and pressure volume 26 behind piston 22 is reduced by allowing the pressure medium to vent through the pilot seat 34', an opening 35' in a retainer 35, a channel 39 and out through crossover connector 50, if it is open. Further the pressure is discharged through a restricted orifice 54' and a channel 54 to the outlet port 60. Consequently, the pressure in the pressure volume 26 behind piston 22 is relieved to a certain extent and the main poppet 24 lifts from valve seat 25 allowing the inlet pressure to pass directly to outlet port 60.

When the valve is used as part of an inflation system, e.g. to inflate the pontoons on a helicopter or other aircraft, a relief valve or orifice 62 is used. The purpose of the relief orifice is to permit the gradual relief of pressure at the outlet port so that a slow leak through the main valve assembly will not cause inflation of the pontoons over a long period of time. Although some pressure leaks through this orifice during an inflation process, it is such a small percentage of the total that it is immaterial. There is also no danger that this orifice will allow the pontoons to deflate, because each pontoon typically has its own one-way valve which prevents deflation through the valve system once it has been inflated.

A unique feature of the present invention is a sensing surface area 37 of the plunger 38. This large annular area is constructed such that the pressure in channel 39 will act to hold plunger 38 in the open position, even if the signal applied to the solenoid is removed, i.e. once the pilot valve is operated there is sufficient pressure acting on surface area 37 to hold it in the open position until the pressure applied to inlet 20, e.g. from supply tanks, drops to an exceedingly low level. The area ratios of the restricted orifices 23', 34' and 54' are designed to keep the proper pressure and flow so that the valve is maintained in the open position over most of the effective range of the input source. In particular, orifice 54' prevents the flow through channel 54 from becoming great enough to reduce the pressure acting on surface 37 to a point where the pin seal could close. The flow through orifice 34', however, must be great enough to keep the pressure in volume 26 from becoming high enough to close the main valve. Likewise the flow through orifice 23' must be such that the pressure in volume 26 is kept in the range needed to be effective on surface 37. Thus if the areas of these orifices are properly selected, there will be a uniform mass flow through all three for any given inlet pressure, over a given range of inlet pressure, such that the valve remains open. Consequently, it can be reasonably assured that the supply tanks will be completely emptied before the valve will close.

In summary, prior to actuating the solenoid plunger 38 and opening the orifice 34' sealed by the plunger poppet 36, the pressure applied at the inlet port 20 is transferred to the back side of the piston 22 through orifice 23' in the piston. At that time there is a sealing load on the main seat equal to the main seat area, which is equivalent to surface 28, times the inlet pressure. Added to this sealing load is the load of spring 27. When the pilot plunger 38 is actuated and the pilot orifice 34' opens, the media flow from behind the main piston pressurizes the volume below surface 37 of the solenoid plunger assembly and the crossover line 50. This plunger volume and the crossover line are connected through an additional control orifice 54' to the outlet side of the main valve. This last restriction 54' serves the purpose of maintaining a pressure under the solenoid plunger assembly sufficient to keep the pilot orifice open until the inlet pressure has decayed to the desired level and further main flow through the valve can be discontinued.

If the area ratios of all three restrictive orifices, i.e. orifices 23', 34' and 54', are properly selected, then mass flow through all three orifices is equal for any given inlet pressure so that the pressure in pressure volume 26 can be maintained sufficiently low to keep the main orifice 25 open and the pressure below the solenoid plunger assembly 38 can be maintained sufficiently high to keep the pilot orifice 34' open throughout a given range of inlet pressures.

Another important feature of the present invention is that the channel 39 leading to the crossover connector has no pressure in it when it is not being used to operate another valve. Therefore, this line need not be of rugged construction, since it has high pressure in it only during an inflation process.

In some prior art devices, the pilot assembly is arranged so that the inlet pressure is connected through the pilot valve to the top of the pilot poppet or pin seal and is exhausted below it. Thus, the pilot valve continually has pressure applied to its interior. In the present invention, however, the pressure is applied to the bottom of the pin seal 36 and is not applied to the interior of the pilot valve until it actually operates. As a result the pilot valve also need not have a rugged construction.

Figure 2:
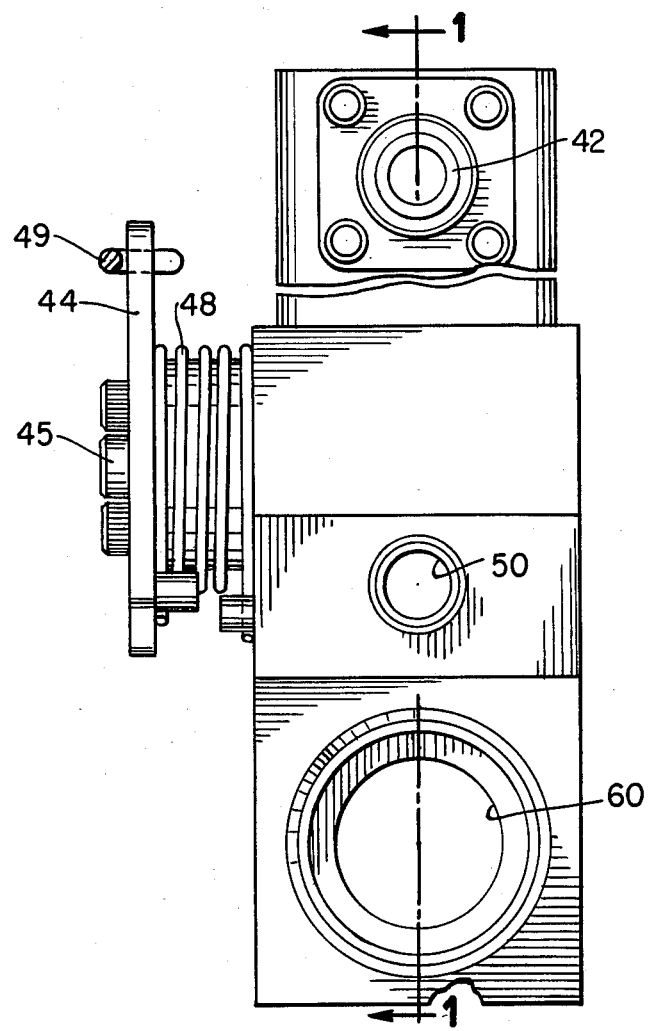
FIG. 2 is a broken end view of the valve of FIG. 1.
Figure 3:
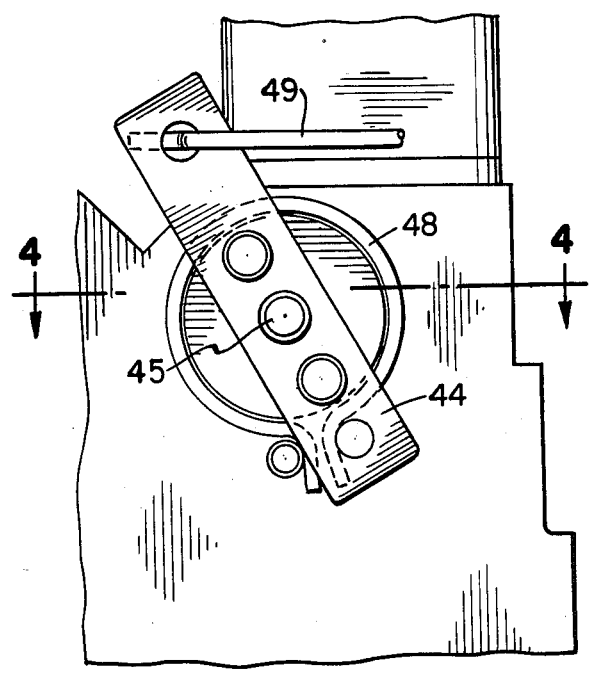
FIG. 3 is a partial side view of the valve of FIG. 1 showing the manual operating lever.
Figure 4:
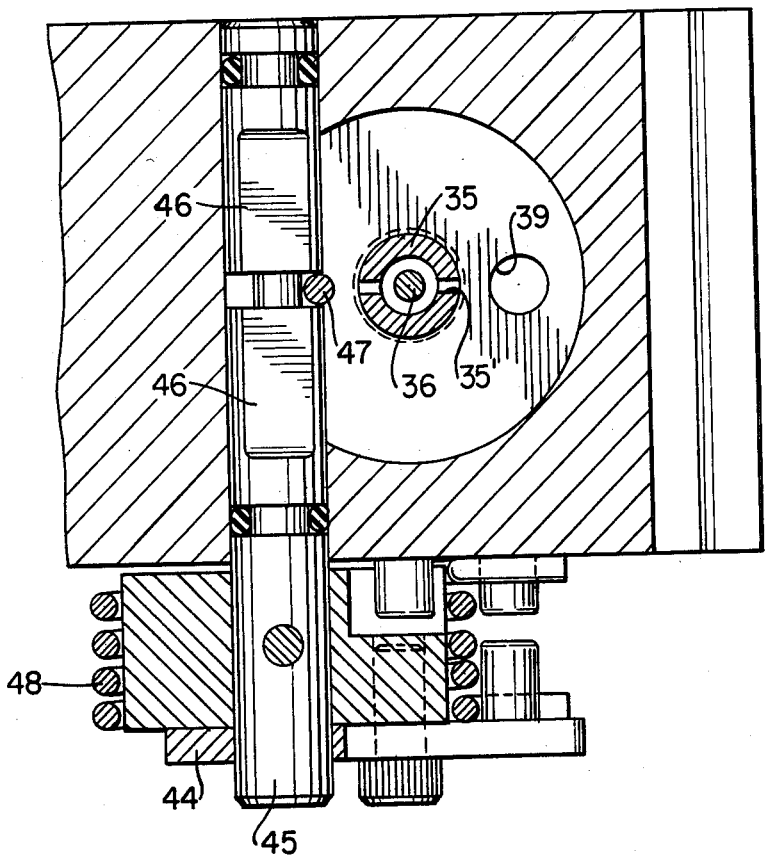
FIG. 4 is a sectional view of the manual operating lever of FIG. 3 along lines 4—4.

The second way of operating the pilot valve is by means of a lever 44 (FIG. 2) which is pivoted to the valve assembly by a shaft 45. The shaft has a flat surface 46 (FIG. 4) by which it contacts plunger 38 (FIG. 1) and moves it upward upon manual rotation of the lever against a coil spring 48 (FIGS. 2 and 4). During this rotary movement the shaft is guided by a pin 47 that is positioned in a groove in shaft 45. This manual movement of plunger 37 by lever 44 may be accomplished from a remote position through the use of a draw string or cable 49. Operation of the valve by the lever 44 produces the same result as the solenoid operation, including the holding of plunger 38 in the open condition via surface 37 until the inlet pressure has dropped to a low level, even though the lever is released and is returned to its rest position by spring 48.

Figure 5:
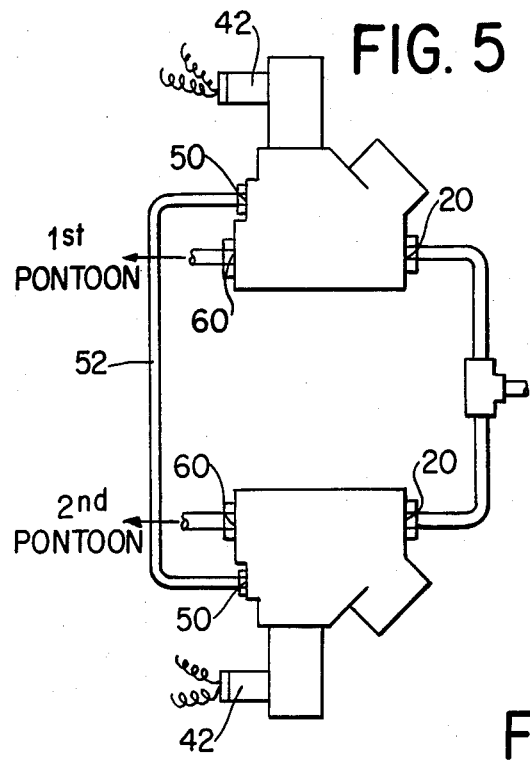
FIG. 5 is a schematic view of an arrangement of valves for inflating two separate pontoons from a single supply tank.

A third means of operating the valve is by way of the crossover connector 50. As previously stated, the pressure in channel 39 is derived from the inlet pressure when the pilot valve 30 has operated. Thus, if this crossover connector 50 is connected via a crossover line 52 to the crossover connector of a similar valve, as shown in FIG. 5, and one of the valves is operated, a high pressure will exist in channel 39 of both valves. This pressure will extend through channel 39 to the sensing surface 37 of plunger 38 in each valve, causing the seal pins 36 to open, which in turn will cause both of the main valve assemblies to open.

The interconnection of the valves is shown in FIG. 5 for a situation in which a single inflation tank inflates two pontoons on an aircraft. Because of the crossover line 52, the operation of one of the valves will assure that the other one operates, even if it does not receive an electrical signal initiated by the pilot. Thus either both pontoons will inflate or neither will. Further, because of the sensing surface 37 in the pilot valve sections, once inflation is started it will continue to completion, even if the electrical signal fails during inflation. This type of redundancy is a safety feature providing critical backup for use on aircraft. Even though two valves and one tank are shown in FIG. 5, any number of valves, may be interconnected from any number of tanks.

Figure 6:
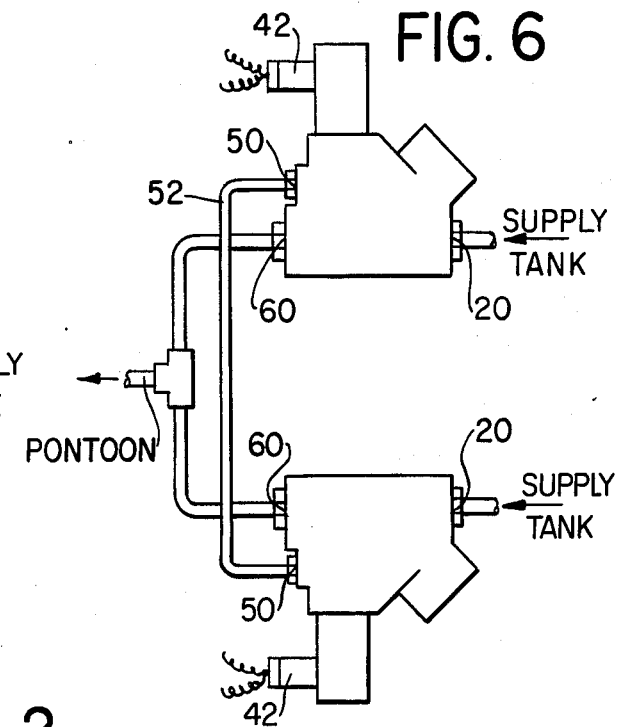
FIG. 6 is a schematic view of an arrangement of valves for inflating a single pontoon using two separate supply tanks.

An alternative arrangement is shown in FIG. 6 wherein two tanks are used to inflate a single pontoon. In this case, the main purpose of the crossover line 52 is to assure total redundancy so that gas pressure from both of the inflation tanks is connected into the system. Further, the sensing surface assures that the connection is maintained until all of the tanks are exhaused.

While the invention has been particularly shown and described with reference to perferred embodiments thereof, it will be understood by those skilled in the art that various changes in form and details may be made therein without departing from the spirit and scope of the invention.

What is claimed is:

1. A valve assembly capable of opening and closing to control the flow of a fluid pressure medium, comprising:
   an inlet port for receiving the fluid medium and an outlet port connected to the inlet port and discharging the fluid medium when the valve assembly is open;
   a main valve seat located between said inlet port and said outlet port;
   a main valve poppet normally urged against said main valve seat to close it, due, at least in part, to the pressure in a pressure volume derived from the fluid medium at the inlet port;
   a cross over opening extending to the exterior of the valve assembly and coupled to said outlet port through a first restricted orifice;
   a conduit leading from the pressure volume to the cross over opening;
   a pilot valve located in said conduit, said pilot valve including a pilot valve seat and a pilot valve pin seal located down stream of said pilot valve seat, said pin seal being urged against said pilot valve seat to close said pilot valve;
   means for moving said pilot valve pin seal away from said pilot valve seat to open said pilot valve so that the pressure in the pressure volume is reduced sufficiently to permit said main valve poppet to move away from said main valve seat due to the passage of fluid medium to said cross over opening and said outlet port, and the pressurization thereof, said means for moving said pilot valve pin seal including a plunger in which said pilot valve pin seal is retained and said plunger having a sensing surface in contact with the fluid pressure medium passed through said pilot seat; and
   orifice means for controlling the flow of medium from the inlet to the cross over opening and outlet port when the pilot valve is opened so as to maintain a certain pressure at the sensing surface for a particular range of inlet pressure, the area of said sensing surface being such that the certain range of pressure at the sensing surface holds the plunger in a position that keeps the pilot valve pin seal away from the pilot valve seat until the inlet pressure drops below the particular range.

2. A valve assembly as claimed in claim 1 further comprising means defining a restricted relief orifice for slowly discharging outside the valve assembly pressure at the outlet port.

3. A valve assembly as claimed in claim 2 wherein the fluid pressure in the pressure volume is delivered from the inlet port to the pressure volume via a second restricted orifice of said orifice means.

4. A valve assembly as claimed in claim 3, said first and second restricted orifices and said pilot valve seat having area ratios such that the sensing surface holds the pilot valve pin seal away from the pilot valve seat for any given inlet pressure over a particular range of inlet pressures.

5. A valve assembly as claimed in claim 1 wherein the main valve poppet is carried by a piston assembly and is urged against said main valve seat in part by a spring acting on said piston assembly, said main valve poppet being urged away from said main valve seat by the inlet fluid pressure acting on surfaces of said piston assembly.

6. A valve assembly as claimed in claim 1 wherein the pilot valve pin seal is retained in a cavity of said plunger and is urged outwardly towards said pilot valve seat by a first pilot spring.

7. A valve assembly as claimed in claims 1 or 6 wherein the plunger is urged in a direction to cause the pilot valve pin seal to seat in the pilot valve seat by a second pilot spring.

8. A valve assembly as claimed in claim 1 wherein the means for moving said pilot valve pin seal includes a solenoid positioned on the downstream side of the pilot valve seat and acting to move said plunger such that the pilot valve is opened.

9. A valve assembly as claimed in claim 8 wherein the means for moving said the pilot valve pin seal includes a lever connected to a shaft for rotation thereof, said shaft including a surface contacting said plunger so that rotation of the shaft due to movement of the lever in one direction will open the pilot valve.

10. A valve assembly as claimed in claim 9 wherein the means for moving said pilot valve pin seal includes means for applying a fluid pressure medium to said crossover opening such that the pressure acting on the sensing surface of said plunger is sufficient to open the pilot valve.

11. A valve assembly as claimed in claim 1 wherein the means for moving said pilot valve pin seal includes a solenoid acting on the pilot valve pin seal for opening said pilot valve.

12. A valve assembly as claimed in claim 1 wherein the means for moving said pilot valve pin seal includes a manually operable lever connected to a shaft, said shaft having a surface portion acting on the pilot valve pin seal for opening said pilot valve.

* * * * *